US011974275B2

(12) United States Patent
Miao

(10) Patent No.: US 11,974,275 B2
(45) Date of Patent: Apr. 30, 2024

(54) ENHANCED HYBRID AUTOMATIC RETRANSMISSION REQUEST (HARQ) FOR SEMI-PERSISTENT SCHEDULED (SPS) DATA TRANSMISSION

(71) Applicant: Apple Inc., Cupertino, CA (US)

(72) Inventor: Honglei Miao, Munich (DE)

(73) Assignee: Apple Inc., Cupertino, CA (US)

(*) Notice: Subject to any disclaimer, the term of this patent is extended or adjusted under 35 U.S.C. 154(b) by 435 days.

(21) Appl. No.: 17/269,169

(22) PCT Filed: Sep. 26, 2019

(86) PCT No.: PCT/US2019/053165
§ 371 (c)(1),
(2) Date: Feb. 17, 2021

(87) PCT Pub. No.: WO2020/069136
PCT Pub. Date: Apr. 2, 2020

(65) Prior Publication Data
US 2021/0250973 A1 Aug. 12, 2021

Related U.S. Application Data

(60) Provisional application No. 62/736,902, filed on Sep. 26, 2018.

(51) Int. Cl.
*H04W 72/12* (2023.01)
*H04L 1/18* (2023.01)
(Continued)

(52) U.S. Cl.
CPC ....... *H04W 72/1273* (2013.01); *H04L 1/1819* (2013.01); *H04L 1/1896* (2013.01);
(Continued)

(58) Field of Classification Search
CPC ... H04W 28/04; H04W 72/04; H04W 72/042; H04W 88/08; H04W 72/535;
(Continued)

(56) References Cited

U.S. PATENT DOCUMENTS 11,671,205 B2* 6/2023 Babaei .................. H04L 1/1812
370/329
11,711,815 B2* 7/2023 Karaki .................. H04L 5/0094
370/329

(Continued)

FOREIGN PATENT DOCUMENTS

CN 108476121 A 8/2018
CN WO 2018141268 A1 * 8/2018 ............ H04W 72/04
(Continued)

OTHER PUBLICATIONS

3GPP TSG RAN WG1 Meeting #94, R1-1809352, Gothenburg, Sweden, Aug. 20-24, 2018, R1-1809352, Agenda Item: 6.1.2.3, Source: Huawei, HiSilicon, Title: Corrections on HARQ-ACK feedback for DL SPS. (Year: 2018).*

(Continued)

*Primary Examiner* — Peter G Solinsky
*Assistant Examiner* — Sanjay K Dewan
(74) *Attorney, Agent, or Firm* — Eschweiler & Potashnik, LLC

(57) ABSTRACT

A device of a New Radio (NR) User Equipment (UE), a method and a machine readable medium to implement the method. The device includes a Radio Frequency (RF) interface, and processing circuitry coupled to the RF interface, the processing circuitry to: decode a downlink (DL) communication from a NR evolved NodeB (gNodeB), the DL communication including DL Semi-Persistent Scheduling (SPS) assignments for respective DL SPS transmissions from the gNodeB, the DL communication further including (Continued)

a SPS Configuration (SPS-Config) parameter, the SPS-Config parameter including information on a symbol-level periodicity of the DL SPS transmissions from the gNodeB; determining the symbol-level periodicity of the DL SPS transmissions from the SPS-Config parameter; and decoding the DL SPS transmissions based on a determination of the symbol-level periodicity of the DL SPS assignments.

20 Claims, 5 Drawing Sheets

(51) Int. Cl.
| | |
|---|---|
| *H04L 1/1812* | (2023.01) |
| *H04L 1/1867* | (2023.01) |
| *H04W 72/04* | (2023.01) |
| *H04W 72/0446* | (2023.01) |
| *H04W 72/1273* | (2023.01) |
| *H04W 72/23* | (2023.01) |
| *H04W 72/50* | (2023.01) |
| *H04W 80/02* | (2009.01) |

(52) U.S. Cl.
CPC ....... *H04W 72/0446* (2013.01); *H04W 72/23* (2023.01); *H04W 72/535* (2023.01); *H04W 80/02* (2013.01)

(58) Field of Classification Search
CPC . H04W 72/23; H04W 72/0446; H04W 80/02; H04W 72/1273; H04W 72/1257; H04W 72/1289; H04L 5/0007; H04L 1/1819; H04L 1/1896
USPC ........................................................ 370/329
See application file for complete search history.

(56) References Cited

U.S. PATENT DOCUMENTS

| | | | |
|---|---|---|---|
| 11,722,255 B2* | 8/2023 | Park ................... | H04L 1/1864 |
| | | | 370/329 |
| 2018/0020387 A1* | 1/2018 | Van Der Velde ..... | H04W 74/02 |
| 2018/0139014 A1 | 5/2018 | Xiong et al. | |
| 2018/0199334 A1 | 7/2018 | Ying et al. | |
| 2018/0227104 A1* | 8/2018 | Han ................... | H04L 5/0053 |

FOREIGN PATENT DOCUMENTS

| | | | | |
|---|---|---|---|---|
| WO | WO 2017/135989 A1 * | 8/2017 | .............. | H04L 5/00 |
| WO | 2018/141268 A1 | 8/2018 | | |
| WO | 2018141268 A1 | 8/2018 | | |
| WO | 2018/169326 A1 | 9/2018 | | |
| WO | WO 2018169326 A1 * | 9/2018 | ........... | H04L 1/1812 |
| WO | WO 2020/069136 A1 * | 4/2020 | ............ | H04W 72/04 |

OTHER PUBLICATIONS

3GPP TSG-RAN WG2 #99, Berlin, Germany, Aug. 21-25, 2017, Tdoc R2-1708351, Agenda Item: 10.3.1.8, Source: Ericsson, Title: SPS Enhancements in NR. (Year: 2017).*
International Search Report dated Jan. 15, 2020 for International Application No. PCT/US2019/053165.
"Corrections on HARQ-ACK feedback for DL SPS." Source: Huawei, HiSilicon. Agenda Item: 6.1.2.3. 3GPP TSG RAN WG1 Meeting #94, Gothenburg, Sweden, Aug. 20-24, 2018. R1-1809352.
"SPS Enhancements in NR." Source: Ericsson. Agenda Item: 10.3.1.8. 3GPP TSG-RAN WG2 #99, Berlin, Germany, Aug. 21-25, 2017. Tdoc R2-1708351.
"Extended European Search Report for European Patent Application No. 19867188.5", dated Mar. 4, 2022, 7 Pages.

* cited by examiner

ENHANCED HYBRID AUTOMATIC RETRANSMISSION REQUEST (HARQ) FOR SEMI-PERSISTENT SCHEDULED (SPS) DATA TRANSMISSION

This application is a National Phase entry application of International Patent Application No. PCT/US2019/053165 filed Sep. 26, 2019, which claims priority to U.S. Provisional Patent Application 62/736,902 entitled "ENHANCED HYBRID AUTOMATIC RETRANSMISSION REQUEST (HARQ) FOR SEMI-PERSISTENT SCHEDULED (SPS) DATA TRANSMISSION," filed Sep. 26, 2018 and is hereby incorporated by reference in its entirety.

FIELD

Various embodiments generally may relate to the field of wireless communications, and particularly to downlink (DL) Semi Persistent Scheduling (SPS) for cellular networks.

BACKGROUND

Current Third Generation Partnership Project (3GPP) New Radio (NR) specifications do not specifically address issues related to downlink (DL) Semi Persistent Scheduling (SPS) in the context of facilitating low latency communications.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Embodiments described herein are related to Third Generation Partnership Project (3GPP) specifications. Examples of these specifications include, but are not limited to, one or more 3GPP New Radio (NR) specifications and one or more specifications directed and/or related to Radio Layer 1 (RAN1) and/or Fifth Generation (5G) mobile networks/systems.

According to 3GPP Technical Report (TR) 22.804 V2.0.0, which is entitled "Service performance and network performance requirements for cyber-physical control applications in vertical domains," the manufacturing industry is currently subject to a fundamental change, which is often referred to as the "Fourth Industrial Revolution" or simply "Industry 4.0". The main goals of Industry 4.0 are the improvement of flexibility, versatility, resource efficiency, cost efficiency, worker support, and quality of industrial production and logistics. As an important use case category of Industry 4.0, factory automation deals with the automated control, monitoring, and optimization of processes and workflows within a factory. This includes aspects like closed-loop control applications, robotics, as well as aspects of computer-integrated manufacturing. Factory automation generally represents a key enabler for industrial mass production with high quality and cost-efficiency. Corresponding applications are often characterized by the highest requirements on the underlying connectivity infrastructure, especially in terms of latency, communication service availability and determinism.

Specifically, motion control (MC) is among the most challenging and demanding closed-loop control applications in the manufacturing industry. An MC system is responsible for controlling moving and/or rotating parts of machines in a well-defined manner, for example in printing machines, machine tools, or packaging machines. Due to the movements/rotations of components, wireless communications based on powerful 5G systems constitute a promising approach.

Figure 1:
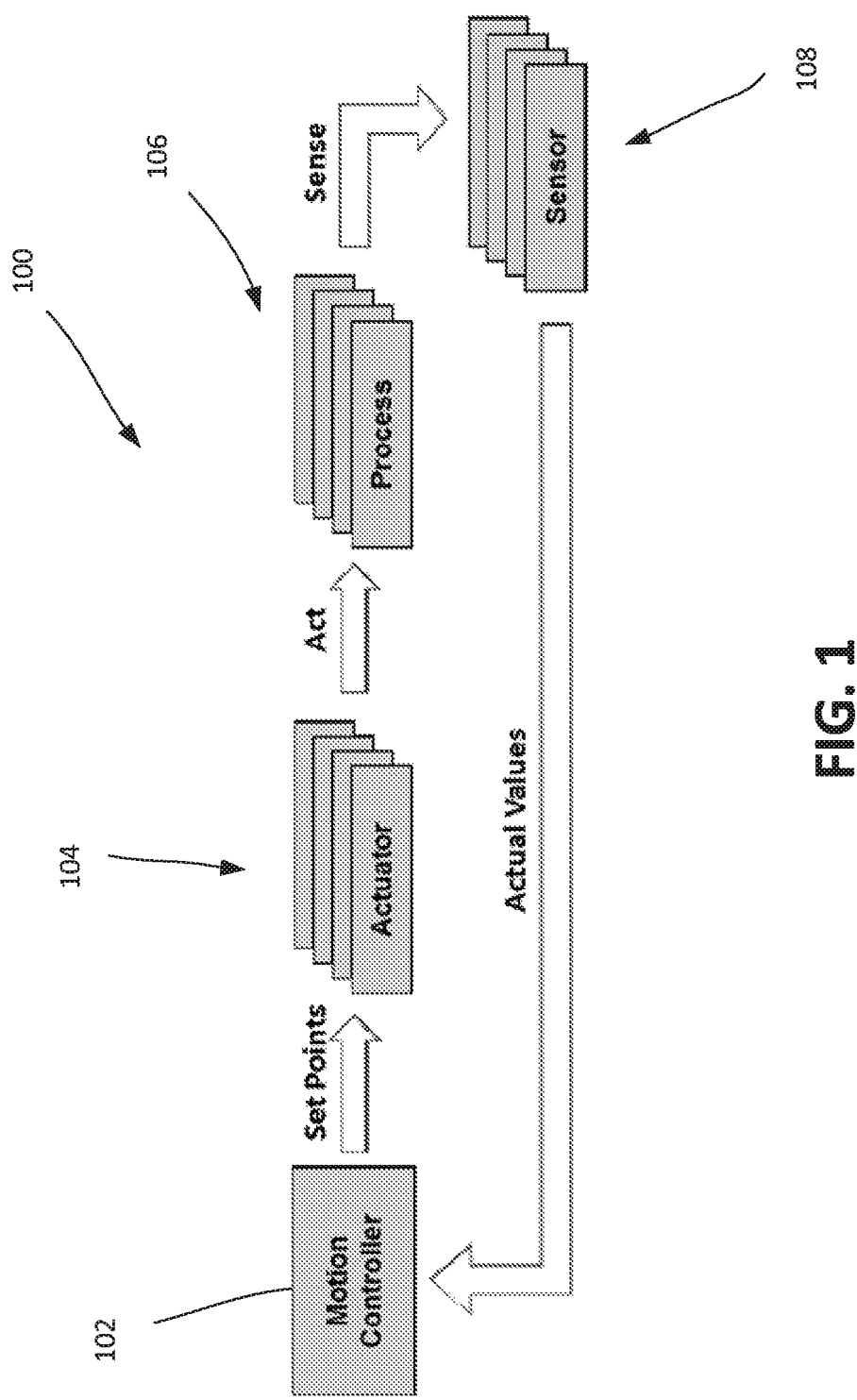
FIG. 1 illustrates a diagram of a Motion Control (MC) closed-loop system.

As illustrated in FIG. 1, a MC closed-loop system 100 is shown. In system 100, motion controller 102 periodically sends desired set points to one or several actuators 104, which perform a corresponding action on one or several processes 106. At the same time, sensors 108 determine the current state of the process(es) and send the actual values back to the motion controller 102. This is done in a strictly cyclic and deterministic manner, such that during one communication cycle time (Tcycle), the motion controller 102 sends updated set points to all actuators 104, and all sensors 108 send their actual values back to the motion controller 102. It is natural that the Semi-Persistent Scheduling (SPS) would be an appealing approach for such deterministic traffic. Specifically, the motion control command can be transmitted by downlink (DL) Semi-Persistent Scheduling (SPS) Physical Downlink Shared Channel (PDSCH), and measurement feedback from actuators 104 can be transmitted by grant-free configured uplink (UL) Physical Uplink Shared Channel (PUSCH). To enhance the process efficiency and feedback latency, it is beneficial to support DL SPS with mini-slot or symbol level periodicity.

Embodiments described herein are directed to techniques (e.g., methods, systems, apparatuses, etc.) for enhancing DL SPS. Specifically, some embodiments assist with enabling the mini-slot or symbol-level periodicity for DL SPS, and with Hybrid Automatic Repeat Request (HARQ) feedback to the scheduled DL data at the mini-slot/symbol-level. DL SPS can also be transmitted according to the configured symbol-level timing.

Embodiments described herein include enhanced SPS methods that can be employed to further shorten the periodicity of DL SPS transmission to mini-slot/symbol level so as to reduce the transmission latency and achieve faster and more accurate motion control. Moreover, a new PUCCH format is also proposed to reduce Hybrid Automatic Repeat Request (HARQ) feedback timing delay with respect to DL SPS data to symbol level. Specifically, the following scheduling components are proposed for DL SPS enhancements in the context of the techniques proposed below.

According to a first technique, Technique No. 1, a periodicity of the SPS periodicity may be reduced. According to one embodiment, the DL SPS periodicity may be enhanced to incorporate more configurations of shorter periodicity than the existing ones so that mini-slot or symbol-level DL SPS periodicity is supported.

According to a first option of Technique No. 1, Option 1, a time-based Enhanced Configuration may be implemented, according to which periodicity is categorized into two classes: millisecond-level and sub-millisecond-level.

According to a second option of Technique No. 1, Option 2: Hybrid Time and Symbol based Enhanced Configuration may be implemented, according to which periodicity is categorized in terms of milliseconds and symbols.

According to a second technique, Technique No. 2, an enhancement may be made to the timing for DL data for HARQ feedback. According to this technique, a new Physical Uplink Control Channel (PUCCH) format may include a parameter named as "nrofSymbolsToDlData", which is used to define the number of symbols between HARQ feedback and the scheduled data. The new PUCCH format may be used together with a Downlink Control Information (DCI) signaling a "dl-DataToUL-ACK" communicated to the UE by way of a DL signal from the gNodeB setting with value 0 for the case where the HARQ feedback is transmitted in the same slot as a scheduled Physical Downlink Shared Channel (PDSCH).

According to a third technique, a combination of Techniques Nos. 1 and 2 may be used. In this embodiment, the combination would enable DL SPS with symbol-level periodicity as well as the required mini-slot/symbol-level HARQ feedback timing.

Embodiments of the techniques described herein enable NR to support DL SPS with mini-slot/symbol-level periodicity as well as the required shorter HARQ feedback time intervals. As a result, faster and more accurate motion control can be achieved. Embodiments of the above techniques will now be described in further detail below.

Enhanced HARQ Feedback Timing for SPS Downlink Transmission

For low latency and high reliability communication required in motion control, and due to deterministic traffic generation, Semi-Persistent Scheduled (SPS) downlink (DL) transmission (DL SPS transmissions) by way of respective DL SPS assignments to be communicated to the UE in a DL communication from the gNodeB are envisioned to provide an efficient scheduling method. In addition, to further reduce latency, sub-slot level HARQ feedback may be provided.

According the current Release 15 (Rel-15) NR specification, the SPS configuration Radio Resource Control (RRC) parameter "SPS-Config" includes the following configuration parameters:

```
SPS-Config ::=           SEQUENCE {
  Periodicity            ENUMERATED {ms10, ms20, ms32,
ms40, ms64, ms80, ms128, ms160, ms320, ms640, spare6, spare5, spare4,
spare3, spare2, spare1},
  nrofHARQ-Processes     INTEGER (1..8),
  n1PUCCH-AN             PUCCH-ResourceId
                         OPTIONAL -- Need M
}
```

In Rel-15, for the DL SPS, a DL assignment is provided by a Physical Downlink Control Channel (PDCCH). The DL assignment may be stored or cleared based on layer 1 (L1) signaling that indicates SPS activation or deactivation. When SPS is released by upper layers, all the corresponding configurations shall be released. After a DL assignment is configured for SPS, a medium access control (MAC) entity shall consider, sequentially, that the Nth DL assignment occurs in the slot for which:

(numberOfSlotsPerFrame×SFN+slot number in the frame)=[(numberOfSlotsPerFrame× $SFN_{start\ time}$+$slot_{start\ time}$)+$N$×periodicity×numberOfSlotsPerFrame/10]modulo(1024×numberOfSlotsPerFrame)

where SFN is the subframe number, $SFN_{start\ time}$ and $slot_{start\ time}$ are the SFN and slot, respectively, of the first transmission of PDSCH where the configured downlink assignment was (re-)initialized.

In order to realize the sub-slot level—i.e., symbol-level—DL SPS transmission, one or more of the following techniques may be used according to embodiments.

Technique No. 1: SPS Periodicity Reduction

For Technique No. 1, the periodicity parameter in the RRC parameter SPS-Config may be further expanded to include more options for symbol-level SPS transmission. For example, the following settings can used for periodicity configuration as described with respect to Options 1 and 2 below.

Option 1: Time Based Enhanced Configuration
Periodicity CHOICE {
  subMilliSeconds INTEGER {1 . . . 32}
  milliSeconds ENUMERATED {ms10, ms20, ms32, ms40, ms64, ms80, ms128, ms160, ms320, ms640, spare6, spare5, spare4, spare3, spare2, spare1}
}

Option 2: Hybrid Time and Symbol Based Enhanced Configuration
Periodicity ENUMERATED {ms10, ms20, ms32, ms40, ms64, ms80, ms128, ms160, ms320, ms640, ms5, ms2, ms1, symbol14, symbol7, symbol4, symbol2}

$SFN_{start\ time}$, $slot_{start\ time}$, and $symbol_{start\ time}$ define the SFN, slot and symbol respectively, of the first transmission of the Physical Downlink Shared Channel (PDSCH) where the configured downlink assignment was (re-)initialized. With the above enhancement, the DL SPS can be configured to support symbol-level periodic transmission.

Specifically, after a DL assignment is configured for SPS with the proposed enhancement, when the configured periodicity has the unit of ms, the MAC entity shall, according to some embodiments, consider sequentially that the Nth downlink assignment occurs in the slot for which:

(numberOfSlotsPerFrame×SFN+slot number in the frame)=[(numberOfSlotsPerFrame× $SFN_{start\ time}$+$slot_{start\ time}$)+$N$×periodicity×numberOfSlotsPerFrame/10]modulo(1024×numberOfSlotsPerFrame)

However, when the configured periodicity has the unit of sub-milliseconds, the MAC entity shall consider sequentially that the Nth downlink assignment occurs in the slot for which:

(numberOfSlotsPerFrame×SFN+slot number in the frame)=[(numberOfSlotsPerFrame× $SFN_{start\ time}$+$slot_{start\ time}$)+$N$×periodicity]modulo (1024×numberOfSlotsPerFrame)

When the configured periodicity has the unit of symbol, the MAC entity shall consider sequentially that the Nth downlink assignment occurs in the symbol of the slot for which:

(numberOfSlotsPerFrame×SFN×14+slot number in the frame×14+symbol number in the slot)= [(numberOfSlotsPerFrame×SFN$_{start\ time}$×14+ slot$_{start\ time}$×14+symbol$_{start\ time}$)+N×periodicity] modulo(1024×numberOfSlotsPerFrame×14)

Technique No. 2: DL Data to HARQ Feedback Timing Enhancement

In Technical Specification (TS) 38.331 ver. 15.2.1, which is entitled "NR; Radio Resource Control (RRC) Protocol Specification (Release 15)," the Physical Uplink Control Channel (PUCCH) resource is configured by RRC signaling as follows:

```
PUCCH-Resource ::=              SEQUENCE {
pucch-ResourceId                PUCCH-ResourceId,
startingPRB                     PRB-Id,
intraSlotFrequencyHopping       ENUMERATED { enabled }
                                OPTIONAL, -- Need R
secondHopPRB                    PRB-Id
                                OPTIONAL, -- Need R
format                          CHOICE {
    format0                         PUCCH-format0,
                                    -- Cond InFirstSetOnly
    format1                         PUCCH-format1,
                                    -- Cond InFirstSetOnly
    format2                         PUCCH-format2,
                                    -- Cond NotInFirstSet
    format3                         PUCCH-format3,
                                    -- Cond NotInFirstSet
    format4                         PUCCH-format4
                                    -- Cond NotInFirstSet
}
}
Where
PUCCH-format0 ::=               SEQUENCE {
initialCyclicShift              INTEGER(0..11),
nrofSymbols                     INTEGER (1..2),
startingSymbolIndex             INTEGER(0..13)
}
```

According to the above configuration, the PUCCH resource format is designed for the dynamically scheduled PDSCH or for SPS PDSCH with a periodicity of multiple slots. However, in mini-slot or symbol level DL SPS, it may be beneficial to enhance the PUCCH format design to enable the case where the time interval between scheduled DL data to the HARQ feedback can be explicitly configured in terms of number of symbols. To this end, an embodiment adds a new PUCCH-format as described below which may be signaled by the UE by way of explicit information, such as explicit RRC signaling:

PUCCH-format5::=SEQUENCE {
initialCyclicShift INTEGER(0 . . . 11),
nrofSymbols INTEGER (1 . . . 2),
nrofSymbolsToDlData INTEGER(1 . . . 13)
}

The above new PUCCH-format5 includes a parameter named as "nrofSymbolsToDlData," which defines the number of symbols between the HARQ feedback and the scheduled PDSCH data. It should be noted that this PUCCH resource should be used together with the dl-DataToUL-ACK setting with value 0, which corresponds to the case where HARQ feedback is transmitted in the same slot as scheduled PDSCH.

Figure 2:
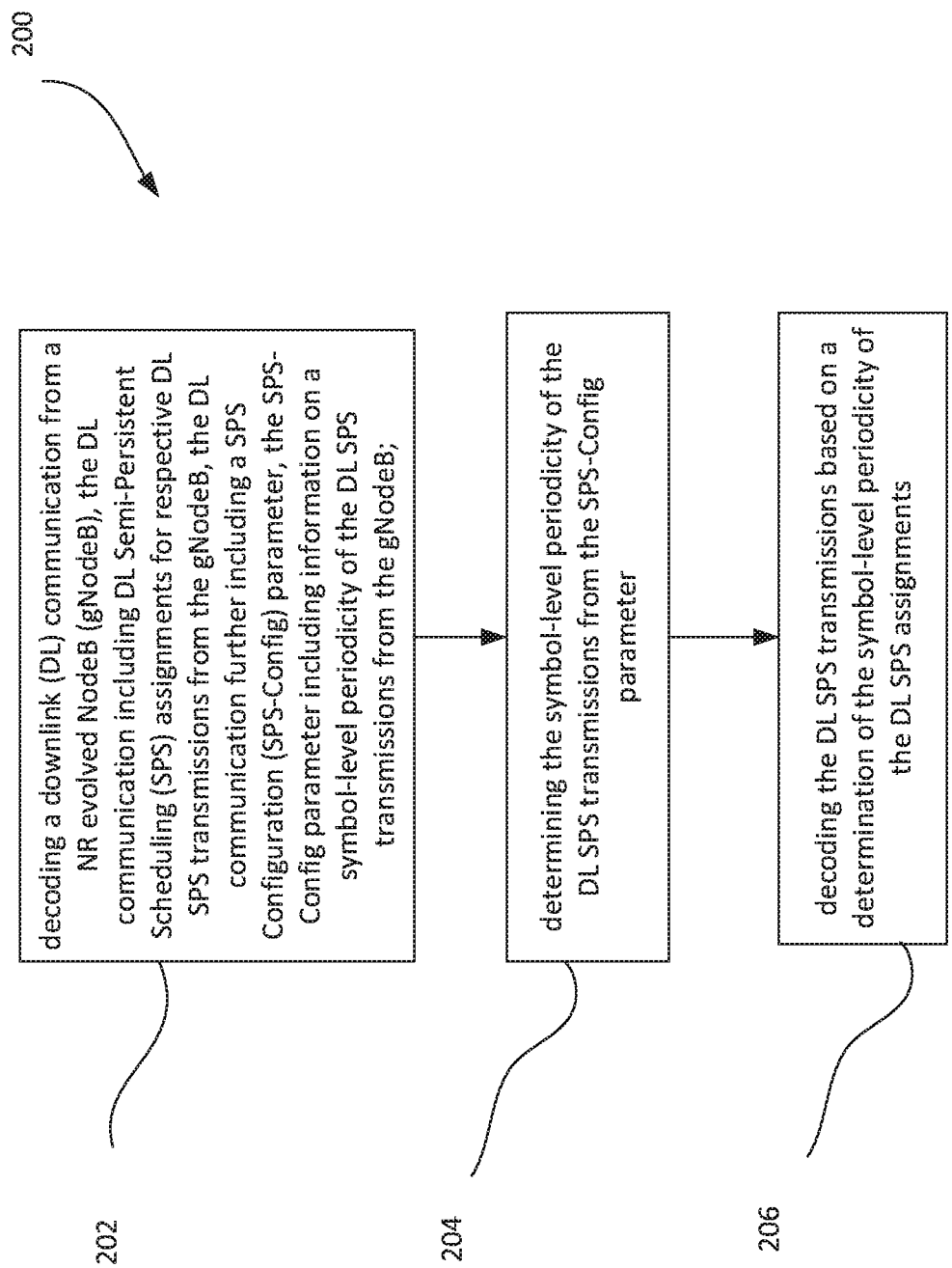
FIG. 2 illustrates a process according to one embodiment.

Referring to FIG. 2, a process 200 according to one embodiment includes at operation 202, decoding a downlink (DL) communication from a NR evolved NodeB (gNodeB), the DL communication including DL Semi-Persistent Scheduling (SPS) assignments for respective DL SPS transmissions from the gNodeB, the DL communication further including a SPS Configuration (SPS-Config) parameter, the SPS-Config parameter including information on a symbol-level periodicity of the DL SPS transmissions from the gNodeB, at operation 204, determining the symbol-level periodicity of the DL SPS transmissions from the SPS-Config parameter, and at operation 206, decoding the DL SPS transmissions based on a determination of the symbol-level periodicity of the DL SPS assignments.

For one or more embodiments, the electronic device(s), network(s), system(s), chip(s) or component(s), or portions or implementations thereof, of one or more of the preceding figures, or some other figure herein may be configured to perform one or more processes, techniques, or methods as described herein, or portions thereof. One such process includes a method, the method comprising: expanding a periodicity parameter to include more options for symbol-level SPS transmission.

Figure 3:
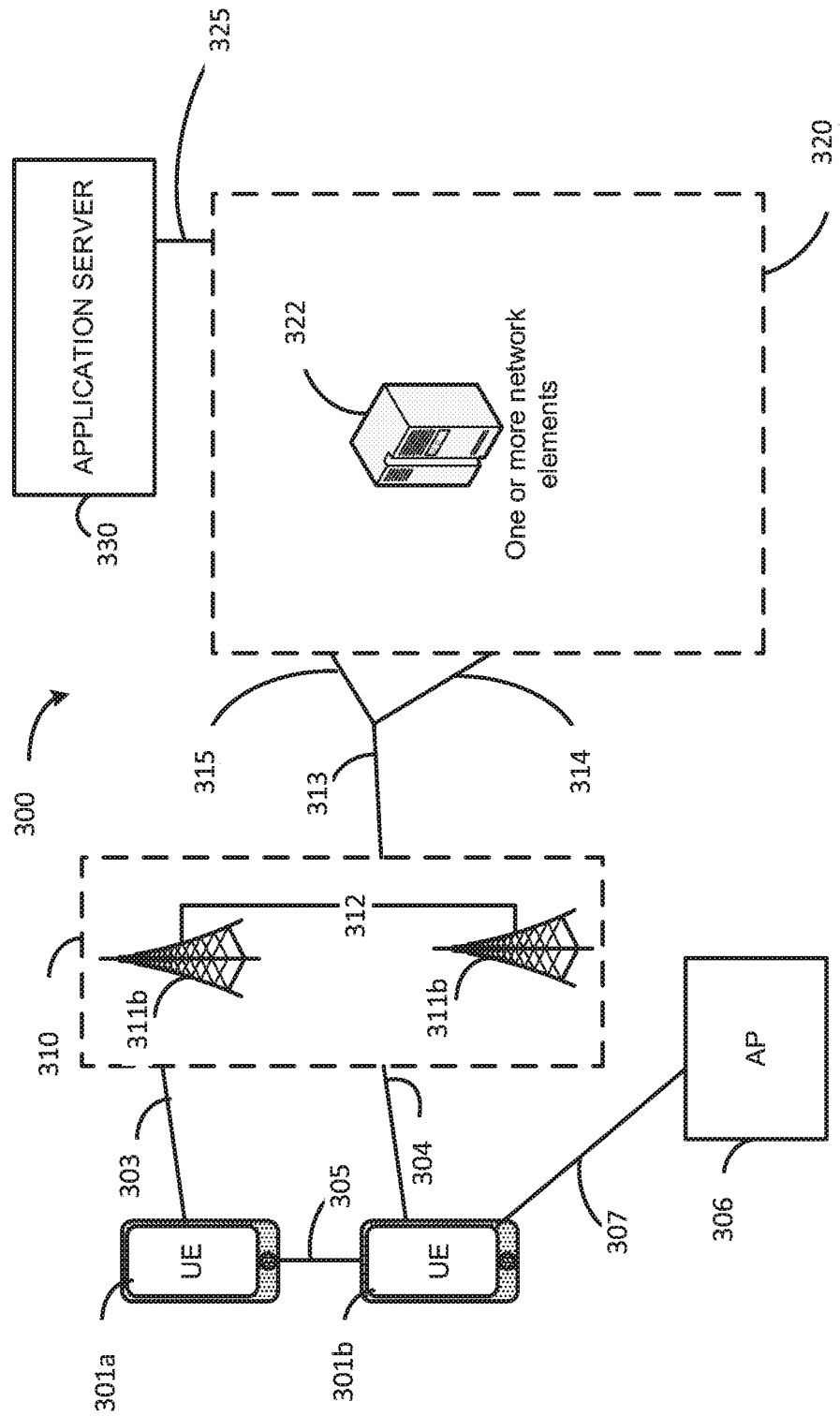
FIG. 3 illustrates an architecture of a system of a network according to some embodiments.

FIG. 3 illustrates an example architecture of a system 300 of a network, in accordance with various embodiments. The following description is provided for an example system 300 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 3, the system 300 includes UE 301a and UE 301b (collectively referred to as "UEs 301" or "UE 301"). In this example, UEs 301 are illustrated as smartphones (e.g., handheld touchscreen mobile computing devices connectable to one or more cellular networks), but may also comprise any mobile or non-mobile computing device. The UEs 301 may be configured to connect, for example, communicatively couple, with an or RAN 310. In embodiments, the RAN 310 may be an NG RAN or a 5G RAN, an E-UTRAN, or a legacy RAN, such as a UTRAN or GERAN.

In this example, the connections 303 and 304 are illustrated as an air interface to enable communicative coupling, and can be consistent with cellular communications protocols. In embodiments, the UEs 301 may directly exchange communication data via a ProSe interface 305. The ProSe interface 305 may alternatively be referred to as a SL interface 305 and may comprise one or more logical channels, including but not limited to a PSCCH, a PSSCH, a PSDCH, and a PSBCH.

The UE 301b is shown to be configured to access an AP 306 (also referred to as "WLAN node 306," "WLAN 306," "WLAN Termination 306," "WT 306" or the like) via connection 307. The connection 307 can comprise a local wireless connection, such as a connection consistent with any IEEE 802.11 protocol, wherein the AP 306 would comprise a wireless fidelity (Wi-Fi®) router.

The RAN 310 can include one or more AN nodes or RAN nodes 311a and 311b (collectively referred to as "RAN nodes 311" or "RAN node 311") that enable the connections 303 and 304. As used herein, the terms "access node," "access point," or the like may describe equipment that provides the radio baseband functions for data and/or voice connectivity between a network and one or more users. These access nodes can be referred to as BS, gNBs, gNodeBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 311 that operates in an NR or 5G system 300 (for example, a gNB), and the term "E-UTRAN node" or the like may refer to a RAN node 311 that operates in an LTE or 4G system 300 (e.g., an eNB). According to various embodiments, the RAN nodes 311 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

Any of the RAN nodes 311 can terminate the air interface protocol and can be the first point of contact for the UEs 301. In some embodiments, any of the RAN nodes 311 can fulfill various logical functions for the RAN 310 including, but not limited to, radio network controller (RNC) functions such as radio bearer management, uplink and downlink dynamic radio resource management and data packet scheduling, and mobility management.

According to various embodiments, the UEs 301, 302 and the RAN nodes 311, 312 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

The PDSCH carries user data and higher-layer signaling to the UEs 301. The PDCCH carries information about the transport format and resource allocations related to the PDSCH channel, among other things. It may also inform the UEs 301 about the transport format, resource allocation, and HARQ information related to the uplink shared channel. Typically, downlink scheduling (assigning control and shared channel resource blocks to the UE 301b within a cell) may be performed at any of the RAN nodes 311 based on channel quality information fed back from any of the UEs 301. The downlink resource assignment information may be sent on the PDCCH used for (e.g., assigned to) each of the UEs 301.

The RAN 310 is shown to be communicatively coupled to a core network—in this embodiment, core network (CN) 320. The CN 320 may comprise a plurality of network elements 322, which are configured to offer various data and telecommunications services to customers/subscribers (e.g., users of UEs 301) who are connected to the CN 320 via the RAN 310. The components of the CN 320 may be implemented in one physical node or separate physical nodes including components to read and execute instructions from a machine-readable or computer-readable medium (e.g., a non-transitory machine-readable storage medium).

Generally, the application server 330 may be an element offering applications that use IP bearer resources with the core network (e.g., UMTS PS domain, LTE PS data services, etc.). The application server 330 can also be configured to support one or more communication services (e.g., VoIP sessions, PTT sessions, group communication sessions, social networking services, etc.) for the UEs 301 via the CN 320.

Figure 4:
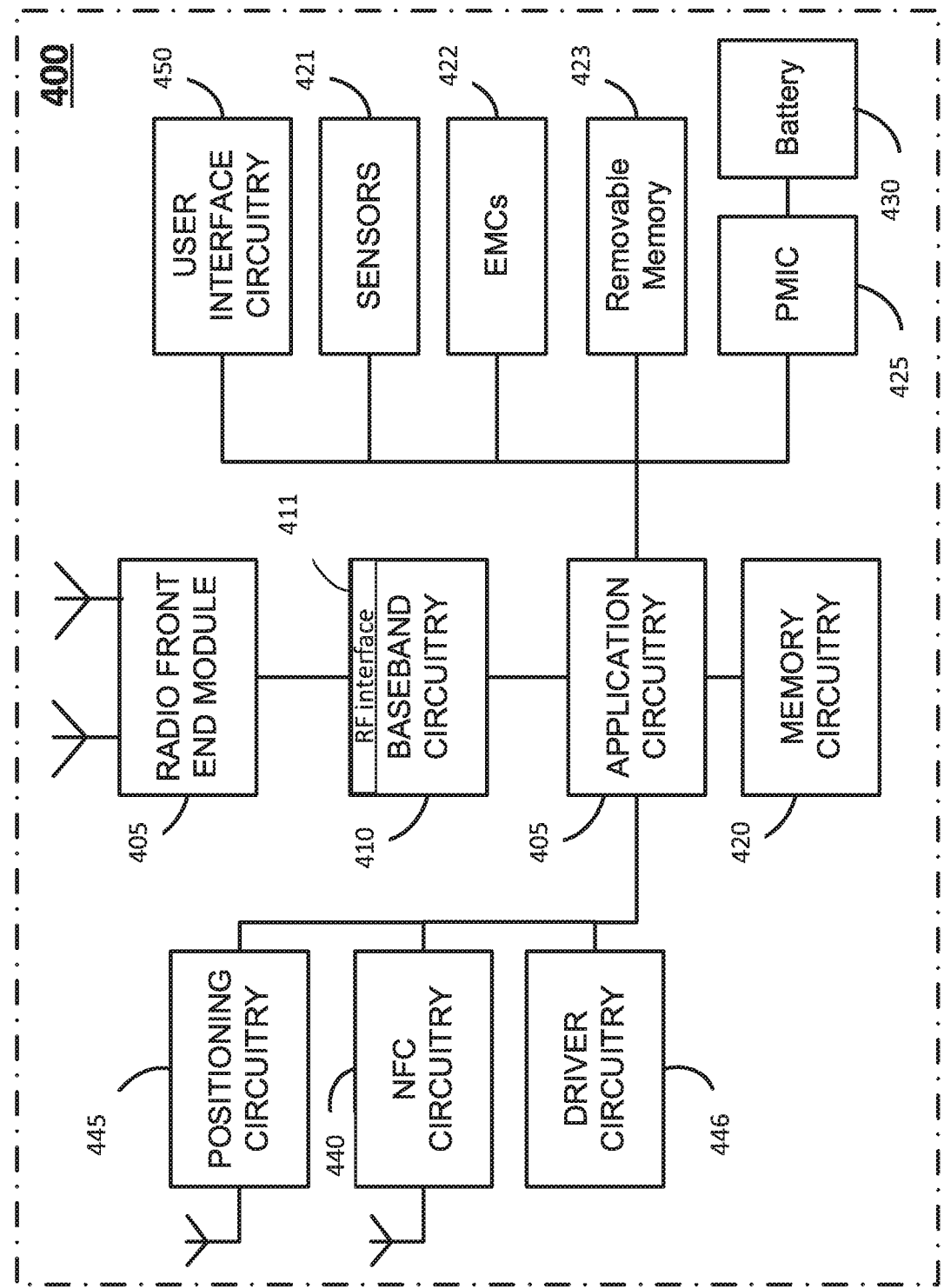
FIG. 4 illustrates an example of a platform in accordance with various embodiments.

FIG. 4 illustrates an example of a platform 400 (or "device 400") in accordance with various embodiments. In embodiments, the computer platform 400 may be suitable for use as UEs 301, 302, application servers 330, and/or any other element/device discussed herein. The platform 400 may include any combinations of the components shown in the example. The components of platform 400 may be implemented as integrated circuits (ICs), portions thereof, discrete electronic devices, or other modules, logic, hardware, software, firmware, or a combination thereof adapted in the computer platform 400, or as components otherwise incorporated within a chassis of a larger system. The block diagram of FIG. 4 is intended to show a high level view of components of the computer platform 400. However, some of the components shown may be omitted, additional components may be present, and different arrangement of the components shown may occur in other implementations.

Application circuitry 405 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof.

Additionally or alternatively, application circuitry 405 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like.

The baseband circuitry 410 may be implemented, for example, as a solder-down substrate including one or more integrated circuits, a single packaged integrated circuit soldered to a main circuit board or a multi-chip module containing two or more integrated circuits. Baseband circuitry 410 is coupled to radio front end module (RFEM) 415 by way of a Radio Frequency (RF) interface 411. Baseband circuitry may include a processing circuitry that is coupled to the RF interface, where the processing circuitry is adapted to encode and decode including modulating and demodulating signals for communication within a wireless network, such as a cellular network. Baseband circuitry 410 may include Medium Access Control (MAC) processing circuitry and Physical layer (PHY) processing circuitry.

The RFEMs 415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 415, which incorporates both mmWave antennas and sub-mmWave.

The memory circuitry 420 may include any number and type of memory devices used to provide for a given amount of system memory. Removable memory circuitry 423 may include devices, circuitry, enclosures/housings, ports or receptacles, etc. used to couple portable data storage devices with the platform 400. These portable data storage devices may be used for mass storage purposes.

The platform 400 may also include interface circuitry (not shown) that is used to connect external devices with the platform 400. The external devices connected to the platform 400 via the interface circuitry include sensor circuitry 421 and electro-mechanical components (EMCs) 422, as well as removable memory devices coupled to removable memory circuitry 423.

The sensor circuitry 421 include devices, modules, or subsystems whose purpose is to detect events or changes in its environment and send the information (sensor data) about the detected events to some other a device, module, subsystem, etc.

EMCs 422 include devices, modules, or subsystems whose purpose is to enable platform 400 to change its state, position, and/or orientation, or move or control a mechanism or (sub)system. Additionally, EMCs 422 may be configured to generate and send messages/signaling to other components of the platform 400 to indicate a current state of the EMCs 422.

In some implementations, the interface circuitry may connect the platform 400 with positioning circuitry 445. The positioning circuitry 445 includes circuitry to receive and decode signals transmitted/broadcasted by a positioning network of a GNSS.

In some implementations, the interface circuitry may connect the platform 400 with Near-Field Communication (NFC) circuitry 440.

The driver circuitry 446 may include software and hardware elements that operate to control particular devices that are embedded in the platform 400, attached to the platform 400, or otherwise communicatively coupled with the platform 400.

The power management integrated circuitry (PMIC) 425 (also referred to as "power management circuitry 425") may manage power provided to various components of the platform 400. A battery 430 may power the platform 400, although in some examples the platform 400 may be mounted deployed in a fixed location, and may have a power supply coupled to an electrical grid. A power block, or other power supply coupled to an electrical grid may be coupled with the BMS to charge the battery 430.

User interface circuitry 450 includes various input/output (I/O) devices present within, or connected to, the platform 400, and includes one or more user interfaces designed to enable user interaction with the platform 400 and/or peripheral component interfaces designed to enable peripheral component interaction with the platform 400.

Figure 5:
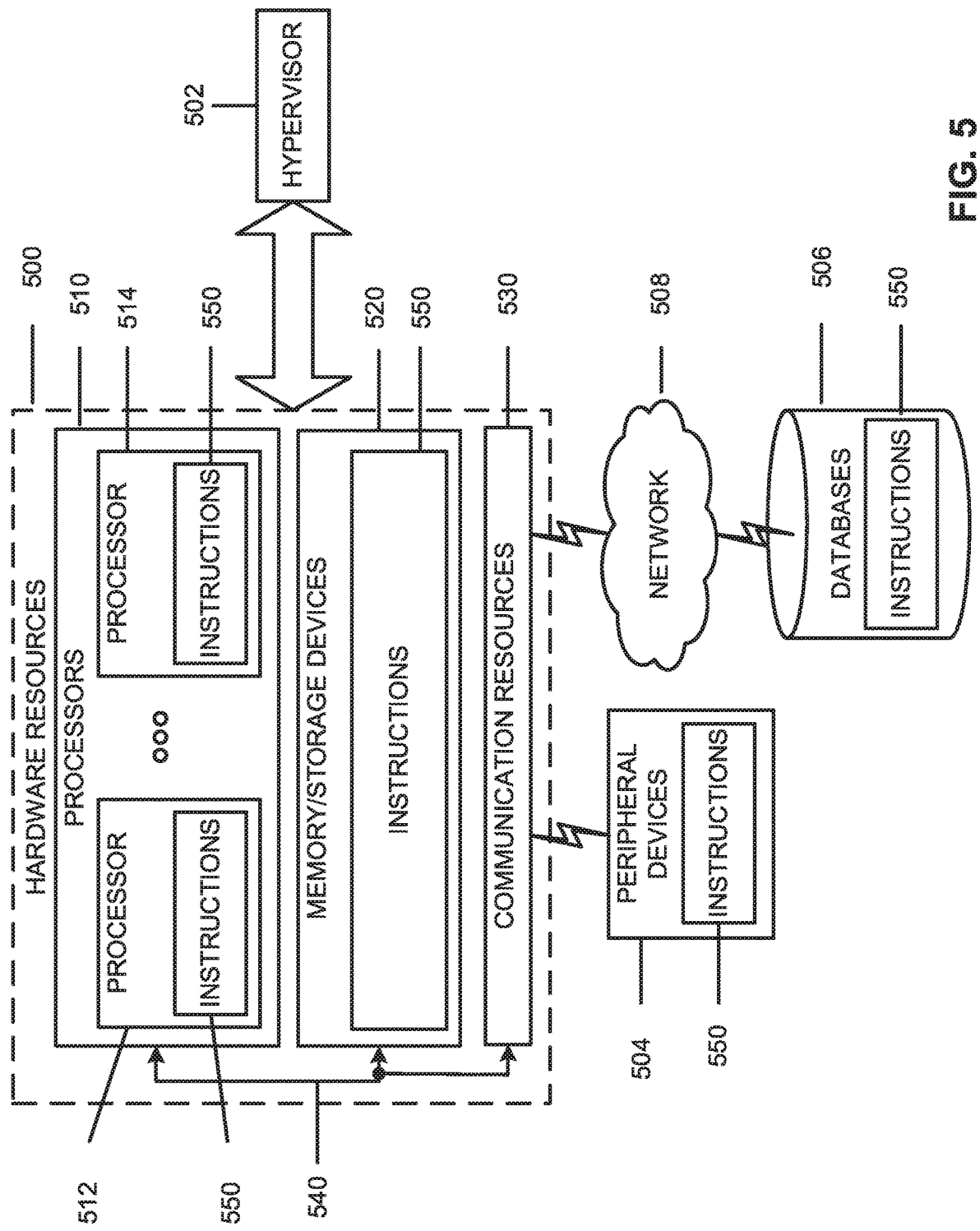
FIG. 5 is a block diagram illustrating components, according to some example embodiments, able to read instructions from a machine-readable or computer-readable medium.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500.

The processors 510 may include, for example, a processor 512 and a processor 514. The memory/storage devices 520 may include main memory, disk storage, or any suitable combination thereof. The communication resources 530 may include interconnection or network interface components or other suitable devices to communicate with one or more peripheral devices 504 or one or more databases 506 via a network 508. Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

In embodiments, the component(s), device(s), system(s), or portions thereof, of at least one of the preceding Figures may be configured to perform one or more operations, techniques, processes, and/or methods as set forth in the example section below. For example, an apparatus may be configured to operate in accordance with one or more of the examples set forth below. For another example, an apparatus may comprise means for operating in accordance with one or more of the examples set forth below in the example section.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The components of any of FIGS. 3-6, such as the shown UEs and gNodeBs, may be used in any of the embodiments described herein.

The examples set forth herein are illustrative and not exhaustive.

Example 1 includes a device of a New Radio (NR) User Equipment (UE), the device including a Radio Frequency (RF) interface, and processing circuitry coupled to the RF interface, the processing circuitry to: decode a downlink (DL) communication from a NR evolved NodeB (gNodeB), the DL communication including DL Semi-Persistent Scheduling (SPS) assignments for respective DL SPS transmissions from the gNodeB, the DL communication further including a SPS Configuration (SPS-Config) parameter, the SPS-Config parameter including information on a symbol-level periodicity of the DL SPS transmissions from the gNodeB; determining the symbol-level periodicity of the DL SPS transmissions from the SPS-Config parameter; and decoding the DL SPS transmissions based on a determination of the symbol-level periodicity of the DL SPS assignments.

Example 2 includes the subject matter of Example 1, and optionally, wherein the symbol-level periodicity includes two classes of periodicity including a submilliseconds level periodicity and a milliseconds level periodicity.

Example 3 includes the subject matter of Example 2, wherein the symbol-level periodicity has a configuration including:
Periodicity CHOICE {
  subMilliSeconds INTEGER {1 . . . 32}
  milliSeconds ENUMERATED {ms10, ms20, ms32, ms40, ms64, ms80, ms128, ms160, ms320, ms640, spare6, spare5, spare4, spare3, spare2, spare1}
}.

Example 4 includes the subject matter of Example 2, and optionally, wherein the symbol-level periodicity has a configuration including:
Periodicity ENUMERATED {ms10, ms20, ms32, ms40, ms64, ms80, ms128, ms160, ms320, ms640, ms5, ms2, ms1, symbol14, symbol7, symbol4, symbol2}.

Example 5 includes the subject matter of Example 2, and optionally, wherein the processing circuitry includes MAC processing circuitry, and wherein determining the symbol-level periodicity includes, in response to a determination that the periodicity has units in milliseconds (ms), using the MAC processing circuitry to determine sequentially that an Nth DL SPS assignment of the DL SPS assignments occurs in a slot of a frame for which:

(numberOfSlotsPerFrame×SFN+slot number in the frame)=[(numberOfSlotsPerFrame× $SFN_{start\ time}$+$slot_{start\ time}$)+N×periodicity×numberOfSlotsPerFrame/10]modulo(1024×numberOfSlotsPerFrame)

where SFN refers to subframe number, and $SFN_{start\ time}$, $slot_{start\ time}$ a SFN and slot respectively, of a first transmission of Physical Downlink Shared Channel (PDSCH) where the DL assignments were initialized or reinitialized.

Example 6 includes the subject matter of Example 2, and optionally, wherein the processing circuitry includes MAC processing circuitry, and wherein determining the symbol-level periodicity includes, in response to a determination that the periodicity has units in submilliseconds, using the MAC processing circuitry to determine sequentially that an Nth DL SPS assignment of the DL SPS assignments occurs in a slot of a frame for which:

(numberOfSlotsPerFrame×SFN+slot number in the frame)=[(numberOfSlotsPerFrame× $SFN_{start\ time}$+$slot_{start\ time}$)+N×periodicity]modulo (1024×numberOfSlotsPerFrame)

where SFN refers to subframe number, and $SFN_{start\ time}$ and $slot_{start\ time}$ define a SFN and slot respectively, of a first transmission of Physical Downlink Shared Channel (PDSCH) where the DL assignments were initialized or reinitialized.

Example 7 includes the subject matter of Example 2, and optionally, wherein the processing circuitry includes MAC processing circuitry, and wherein determining the symbol-level periodicity includes, in response to a determination that the periodicity has units in symbols, using the MAC processing circuitry to determine sequentially that an Nth DL SPS assignment of the DL SPS assignments occurs in a symbol of a slot for which:

(numberOfSlotsPerFrame×SFN×14+slot number in the frame×14+symbol number in the slot)= [(numberOfSlotsPerFrame×$SFN_{start\ time}$×14+ $slot_{start\ time}$×14+$symbol_{start\ time}$)+N×periodicity] modulo(1024×numberOfSlotsPerFrame×14)

wherein $SFN_{start\ time}$, $slot_{start\ time}$, and $symbol_{start\ time}$ define the SFN, slot and symbol respectively, of a first transmission of Physical Downlink Shared Channel (PDSCH) where the DL assignments were initialized or reinitialized.

Example 8 includes the subject matter of Example 2, and optionally, wherein the processing circuitry is to: decode a DL signal comprising a Physical Uplink Control Channel (PUCCH) parameter including explicit information on a time interval between scheduled Physical Downlink Shared Channel (PDSCH) data and a Hybrid Automatic Repeat Request (HARQ) feedback where DL SPS assignments are used with symbol-level periodicity, the explicit information including a nrofSymbolsToDlData parameter which defines the time interval in terms of a number of symbols between the HARQ feedback and the scheduled PDSCH data; and encode for transmission to the gNodeB a PUCCH, a format of the PUCCH being based on the explicit information in the DL PUCCH parameter.

Example 9 includes the subject matter of Example 8, and optionally, wherein the format of the PUCCH (PUCCH-format) is based on:

```
PUCCH-format5 ::=        SEQUENCE {
    initialCyclicShift       INTEGER(0..11),
    nrofSymbols              INTEGER (1..2),
    nrofSymbolsToDlData           INTEGER(1..13)
}
```

Example 10 includes the subject matter of any one of Examples 8-9, and optionally, wherein the DL signal includes a dl-DataToUL-ACK parameter, and wherein the processing circuitry is to decode a value of 0 for the dl-DataToUL-ACK parameter, and to determine the value of 0 to correspond to the HARQ feedback being transmitted in a same slot as the scheduled PDSCH.

Example 11 includes the subject matter of any one of Examples 8-10, and optionally, wherein the DL communication and the DL signal correspond to a DL Control Information (DCI).

Example 12 includes the subject matter of any one of Examples 1-11, and optionally, further including a front end module coupled to the RF interface of the processing circuitry.

Example 13 includes the subject matter of Example 12, and optionally, further including one or more antennas coupled to the front end module, the one or more antennas to communicate DL and uplink (UL) signals with the gNodeB.

Example 14 includes a method to be performed at a device of a New Radio (NR) User Equipment (UE), the method including: decoding a downlink (DL) communication from a NR evolved NodeB (gNodeB), the DL communication including DL Semi-Persistent Scheduling (SPS) assignments for respective DL SPS transmissions from the gNodeB, the DL communication further including a SPS Configuration (SPS-Config) parameter, the SPS-Config parameter including information on a symbol-level periodicity of the DL SPS transmissions from the gNodeB; determining the symbol-level periodicity of the DL SPS transmissions from the SPS-Config parameter; and decoding the DL SPS transmissions based on a determination of the symbol-level periodicity of the DL SPS assignments.

Example 15 includes the subject matter of Example 14, and optionally, wherein the symbol-level periodicity includes two classes of periodicity including a submilliseconds level periodicity and a milliseconds level periodicity.

Example 16 includes the subject matter of Example 15, and optionally, wherein the symbol-level periodicity has a configuration including:
Periodicity CHOICE {
    subMilliSeconds INTEGER {1 ... 32}
    milliSeconds ENUMERATED {ms10, ms20, ms32, ms40, ms64, ms80, ms128, ms160, ms320, ms640, spare6, spare5, spare4, spare3, spare2, spare1}
}.

Example 17 includes the subject matter of Example 15, and optionally, wherein the symbol-level periodicity has a configuration including:
Periodicity ENUMERATED {ms10, ms20, ms32, ms40, ms64, ms80, ms128, ms160, ms320, ms640, ms5, ms2, ms1, symbol14, symbol7, symbol4, symbol2}.

Example 18 includes the subject matter of Example 15, and optionally, wherein determining the symbol-level periodicity includes, in response to a determination that the periodicity has units in milliseconds (ms), using a MAC processing circuitry of the device to determine sequentially that an Nth DL SPS assignment of the DL SPS assignments occurs in a slot of a frame for which:

(numberOfSlotsPerFrame×SFN+slot number in the frame)=[(numberOfSlotsPerFrame× $SFN_{start\ time}$+$slot_{start\ time}$)+N×periodicity×numberOfSlotsPerFrame/10]modulo(1024×numberOfSlotsPerFrame)

where SFN refers to subframe number, and $SFN_{start\ time}$, $slot_{start\ time}$ a SFN and slot respectively, of a first transmission of Physical Downlink Shared Channel (PDSCH) where the DL assignments were initialized or reinitialized.

Example 19 includes the subject matter of Example 15, and optionally, wherein determining the symbol-level periodicity includes, in response to a determination that the periodicity has units in milliseconds (ms), using a MAC processing circuitry of the device to determine sequentially that an Nth DL SPS assignment of the DL SPS assignments occurs in a slot of a frame for which:

(numberOfSlotsPerFrame×SFN+slot number in the frame)=[(numberOfSlotsPerFrame× $SFN_{start\ time}$+$slot_{start\ time}$)+N×periodicity]modulo (1024×numberOfSlotsPerFrame)

where SFN refers to subframe number, and $SFN_{start\ time}$ and $slot_{start\ time}$ define a SFN and slot respectively, of a first transmission of Physical Downlink Shared Channel (PDSCH) where the DL assignments were initialized or reinitialized.

Example 20 includes the subject matter of Example 15, and optionally, wherein determining the symbol-level periodicity includes, in response to a determination that the periodicity has units in symbols, using a MAC processing circuitry of the device to determine sequentially that an Nth DL SPS assignment of the DL SPS assignments occurs in a symbol of a slot for which:

(numberOfSlotsPerFrame×SFN×14+slot number in the frame×14+symbol number in the slot)= [(numberOfSlotsPerFrame×$SFN_{start\ time}$×14+ $slot_{start\ time}$×14+$symbol_{start\ time}$)+N×periodicity] modulo(1024×numberOfSlotsPerFrame×14)

wherein $SFN_{start\ time}$, $slot_{start\ time}$, and $symbol_{start\ time}$ define the SFN, slot and symbol respectively, of a first transmission of Physical Downlink Shared Channel (PDSCH) where the DL assignments were initialized or reinitialized.

Example 21 includes the subject matter of Example 15, and optionally, further including: decoding a DL signal comprising a Physical Uplink Control Channel (PUCCH) parameter including explicit information on a time interval between scheduled Physical Downlink Shared Channel (PDSCH) data and a Hybrid Automatic Repeat Request (HARQ) feedback where DL SPS assignments are used with symbol-level periodicity, the explicit information including a nrofSymbolsToDlData parameter which defines the time interval in terms of a number of symbols between the HARQ feedback and the scheduled PDSCH data; and encoding for transmission to the gNodeB a PUCCH, a format of the PUCCH being based on the explicit information in the DL PUCCH parameter.

Example 22 includes the subject matter of Example 21, and optionally, wherein the format of the PUCCH (PUCCH-format) is based on:

PUCCH-format5 ::=        SEQUENCE {
    initialCyclicShift       INTEGER(0..11),
    nrofSymbols              INTEGER (1..2),
    nrofSymbolsToDlData      INTEGER(1..13)
}

Example 23 includes the method of any one of Examples 21-22, and optionally, wherein the DL signal includes a dl-DataToUL-ACK parameter, and wherein the method further includes decoding a value of 0 for the dl-DataToUL-ACK parameter, and determining the value of 0 to correspond to the HARQ feedback being transmitted in a same slot as the scheduled PDSCH.

Example 24 includes the method of any one of Examples 21-23, and optionally, wherein the DL communication and the DL signal correspond to a DL Control Information (DCI).

Example 25 includes device of a New Radio (NR) User Equipment (UE), the device including: means for decoding a downlink (DL) communication from a NR evolved NodeB (gNodeB), the DL communication including DL Semi-Persistent Scheduling (SPS) assignments for respective DL SPS transmissions from the gNodeB, the DL communication further including a SPS Configuration (SPS-Config) parameter, the SPS-Config parameter including information on a symbol-level periodicity of the DL SPS transmissions from the gNodeB; means for determining the symbol-level periodicity of the DL SPS transmissions from the SPS-Config parameter; and means for decoding the DL SPS transmissions based on a determination of the symbol-level periodicity of the DL SPS assignments.

Example 26 includes the subject matter of Example 25, and optionally, wherein the symbol-level periodicity includes two classes of periodicity including a submilliseconds level periodicity and a milliseconds level periodicity.

Example 27 includes the subject matter of Example 26, and optionally, wherein the symbol-level periodicity has a configuration including:
Periodicity CHOICE {
    subMilliSeconds INTEGER {1 ... 32}
    milliSeconds ENUMERATED {ms10, ms20, ms32, ms40, ms64, ms80, ms128, ms160, ms320, ms640, spare6, spare5, spare4, spare3, spare2, spare1}
}.

Example X28 includes the subject matter of Example 26, and optionally, wherein the symbol-level periodicity has a configuration including:
Periodicity ENUMERATED {ms10, ms20, ms32, ms40, ms64, ms80, ms128, ms160, ms320, ms640, ms5, ms2, ms1, symbol14, symbol7, symbol4, symbol2}.

Example 29 includes a device of a New Radio (NR) evolved Node B (gNodeB), the device including a Radio Frequency (RF) interface, and processing circuitry coupled to the RF interface, the processing circuitry to: encode a downlink (DL) communication to a NR User Equipment (UE), the DL communication including DL Semi-Persistent Scheduling (SPS) assignments for respective DL SPS transmissions from the gNodeB, the DL communication further including a SPS Configuration (SPS-Config) parameter, the SPS-Config parameter including information on a symbol-level periodicity of the DL SPS transmissions from the gNodeB; and encode for transmission to the UE the SL SPS transmissions based on the SPS-Config parameter.

Example 30 includes the subject matter of Example 29, and optionally, wherein the symbol-level periodicity includes two classes of periodicity including a submilliseconds level periodicity and a milliseconds level periodicity.

Example 31 includes the subject matter of Example 30, and optionally, wherein the symbol-level periodicity has a configuration including:
Periodicity CHOICE {
   subMilliSeconds INTEGER {1 . . . 32}
   milliSeconds ENUMERATED {ms10, ms20, ms32, ms40, ms64, ms80, ms128, ms160, ms320, ms640, spare6, spare5, spare4, spare3, spare2, spare1}
}.

Example 32 includes the subject matter of Example 30, and optionally, wherein the symbol-level periodicity has a configuration including:
Periodicity ENUMERATED {ms10, ms20, ms32, ms40, ms64, ms80, ms128, ms160, ms320, ms640, ms5, ms2, ms1, symbol14, symbol7, symbol4, symbol2}.

Example 33 includes the subject matter of Example 30, and optionally, wherein an Nth DL SPS assignment of the DL SPS assignments is to occur in a slot for which:

(numberOfSlotsPerFrame×SFN+slot number in the frame)=[(numberOfSlotsPerFrame× $SFN_{start\ time}$+$slot_{start\ time}$)+N×periodicity×numberOfSlotsPerFrame/10]modulo(1024×numberOfSlotsPerFrame)

where SFN refers to subframe number, and $SFN_{start\ time}$, $slot_{start\ time}$ a SFN and slot respectively, of a first transmission of Physical Downlink Shared Channel (PDSCH) where the DL assignments were initialized or reinitialized.

Example 34 includes the subject matter of Example 30, and optionally, wherein an Nth DL SPS assignment of the DL SPS assignments is to occur in a slot for which:

(numberOfSlotsPerFrame×SFN+slot number in the frame)=[(numberOfSlotsPerFrame× $SFN_{start\ time}$+$slot_{start\ time}$)+N×periodicity]modulo (1024×numberOfSlotsPerFrame)

where SFN refers to subframe number, and $SFN_{start\ time}$ and $slot_{start\ time}$ define a SFN and slot respectively, of a first transmission of Physical Downlink Shared Channel (PDSCH) where the DL assignments were initialized or reinitialized.

Example 35 includes the subject matter of Example 30, and optionally, wherein an Nth DL SPS assignment of the DL SPS assignments is to occur in a slot for which:

(numberOfSlotsPerFrame×SFN×14+slot number in the frame×14+symbol number in the slot)= [(numberOfSlotsPerFrame×$SFN_{start\ time}$×14+ $slot_{start\ time}$×14+$symbol_{start\ time}$)+N×periodicity] modulo(1024×numberOfSlotsPerFrame×14)

wherein $SFN_{start\ time}$, $slot_{start\ time}$, and $symbol_{start\ time}$ define the SFN, slot and symbol respectively, of a first transmission of Physical Downlink Shared Channel (PDSCH) where the DL assignments were initialized or reinitialized.

Example 36 includes the subject matter of Example 30, and optionally, wherein the processing circuitry is to: encode a DL signal comprising a Physical Uplink Control Channel (PUCCH) parameter including explicit information on a time interval between scheduled Physical Downlink Shared Channel (PDSCH) data and a Hybrid Automatic Repeat Request (HARQ) feedback where DL SPS assignments are used with symbol-level periodicity, the explicit information including a nrofSymbolsToDlData parameter which defines the time interval in terms of a number of symbols between the HARQ feedback and the scheduled PDSCH data; and decode a PUCCH from the UE, a format of the PUCCH being based on the explicit information in the DL PUCCH parameter.

Example 37 includes the subject matter of Example 36, and optionally, wherein the format of the PUCCH (PUCCH-format) is based on:

| | |
|---|---|
| PUCCH-format5 ::= | SEQUENCE { |
| initialCyclicShift | INTEGER(0..11), |
| nrofSymbols | INTEGER (1..2), |
| nrofSymbolsToDlData | INTEGER(1..13) |
| } | |

Example 38 includes the subject matter of any one of Examples 36-37, and optionally, wherein the DL signal includes a dl-DataToUL-ACK parameter, and wherein a value of 0 for the dl-DataToUL-ACK parameter corresponds to the HARQ feedback being transmitted in a same slot as the scheduled PDSCH.

Example 39 includes the subject matter of any one of Examples 36-38, and optionally, wherein the DL communication and the DL signal correspond to a DL Control Information (DCI).

Example 40 includes the subject matter of Examples 29-39, and optionally further including a front end module coupled to the RF interface of the processing circuitry.

Example 41 includes the subject matter of Example 40, and optionally, further including one or more antennas coupled to the front end module, the one or more antennas to communicate DL and uplink (UL) signals with the UE.

Example 42 includes a method to be performed at a device of a New Radio (NR) evolved Node B (gNodeB), the method including: encoding a downlink (DL) communication to a NR User Equipment (UE), the DL communication including DL Semi-Persistent Scheduling (SPS) assignments for respective DL SPS transmissions from the gNodeB, the DL communication further including a SPS Configuration (SPS-Config) parameter, the SPS-Config parameter including information on a symbol-level periodicity of the DL SPS transmissions from the gNodeB; and encoding for transmission to the UE the SL SPS transmissions based on the SPS-Config parameter.

Example 43 includes the subject matter of Example 42, and optionally, wherein the symbol-level periodicity includes two classes of periodicity including a submilliseconds level periodicity and a milliseconds level periodicity.

Example 44 includes the subject matter of Example 43, and optionally, wherein the symbol-level periodicity has a configuration including:
Periodicity CHOICE {
  subMilliSeconds INTEGER {1 . . . 32}
  milliSeconds ENUMERATED {ms10, ms20, ms32, ms40, ms64, ms80, ms128, ms160, ms320, ms640, spare6, spare5, spare4, spare3, spare2, spare1}
}.

Example 45 includes the subject matter of Example 43, and optionally, wherein the symbol-level periodicity has a configuration including:
Periodicity ENUMERATED {ms10, ms20, ms32, ms40, ms64, ms80, ms128, ms160, ms320, ms640, ms5, ms2, ms1, symbol14, symbol7, symbol4, symbol2}.

Example 46 includes the subject matter of Example 43, and optionally, wherein an Nth DL SPS assignment of the DL SPS assignments is to occur in a slot for which:

(numberOfSlotsPerFrame×SFN+slot number in the frame)=[(numberOfSlotsPerFrame× $SFN_{start\ time}$+$slot_{start\ time}$)+N×periodicity×numberOfSlotsPerFrame/10]modulo(1024×numberOfSlotsPerFrame)

where SFN refers to subframe number, and $SFN_{start\ time}$, $slot_{start\ time}$ a SFN and slot respectively, of a first transmission of Physical Downlink Shared Channel (PDSCH) where the DL assignments were initialized or reinitialized.

Example 47 includes the subject matter of Example 43, and optionally, wherein an Nth DL SPS assignment of the DL SPS assignments is to occur in a slot for which:

(numberOfSlotsPerFrame×SFN+slot number in the frame)=[(numberOfSlotsPerFrame× $SFN_{start\ time}$+$slot_{start\ time}$)+N×periodicity]modulo (1024×numberOfSlotsPerFrame)

where SFN refers to subframe number, and $SFN_{start\ time}$ and $slot_{start\ time}$ define a SFN and slot respectively, of a first transmission of Physical Downlink Shared Channel (PDSCH) where the DL assignments were initialized or reinitialized.

Example 48 includes the subject matter of Example 43, and optionally, wherein an Nth DL SPS assignment of the DL SPS assignments is to occur in a slot for which:

(numberOfSlotsPerFrame×SFN×14+slot number in the frame×14+symbol number in the slot)= [(numberOfSlotsPerFrame×$SFN_{start\ time}$×14+ $slot_{start\ time}$×14+$symbol_{start\ time}$)+N×periodicity] modulo(1024×numberOfSlotsPerFrame×14)

wherein $SFN_{start\ time}$, $slot_{start\ time}$, and $symbol_{start\ time}$ define the SFN, slot and symbol respectively, of a first transmission of Physical Downlink Shared Channel (PDSCH) where the DL assignments were initialized or reinitialized.

Example 49 includes the subject matter of Example 43, and optionally, further including: encoding a DL signal comprising a Physical Uplink Control Channel (PUCCH) parameter including explicit information on a time interval between scheduled Physical Downlink Shared Channel (PDSCH) data and a Hybrid Automatic Repeat Request (HARQ) feedback where DL SPS assignments are used with symbol-level periodicity, the explicit information including a nrofSymbolsToDlData parameter which defines the time interval in terms of a number of symbols between the HARQ feedback and the scheduled PDSCH data; and decoding a PUCCH from the UE, a format of the PUCCH being based on the explicit information in the DL PUCCH parameter.

Example 50 includes the subject matter of Example 49, and optionally, wherein the format of the PUCCH (PUCCH-format) is based on:

| PUCCH-format5 ::= | SEQUENCE { |
|---|---|
| initialCyclicShift | INTEGER(0..11), |
| nrofSymbols | INTEGER (1..2), |
| nrofSymbolsToDlData | INTEGER(1..13) |
| } | |

Example 51 includes the method of any one of Examples 49-50, and optionally, wherein the DL signal includes a dl-DataToUL-ACK parameter, and wherein a value of 0 for the dl-DataToUL-ACK parameter corresponds to the HARQ feedback being transmitted in a same slot as the scheduled PDSCH.

Example 52 includes the method of any one of Examples 49-51, and optionally, wherein the DL communication and the DL signal correspond to a DL Control Information (DCI).

Example 53 includes a device of a New Radio (NR) evolved Node B (gNodeB), the device including: means for encoding a downlink (DL) communication to a NR User Equipment (UE), the DL communication including DL Semi-Persistent Scheduling (SPS) assignments for respective DL SPS transmissions from the gNodeB, the DL communication further including a SPS Configuration (SPS-Config) parameter, the SPS-Config parameter including information on a symbol-level periodicity of the DL SPS transmissions from the gNodeB; and means for encoding for transmission to the UE the DL SPS transmissions based on the SPS-Config parameter.

Example 54 includes the subject matter of Example 53, and optionally, wherein the symbol-level periodicity includes two classes of periodicity including a submilliseconds level periodicity and a milliseconds level periodicity.

Example 55 includes the subject matter of Example 54, and optionally, wherein the symbol-level periodicity has a configuration including:
Periodicity CHOICE {
  subMilliSeconds INTEGER {1 . . . 32}
  milliSeconds ENUMERATED {ms10, ms20, ms32, ms40, ms64, ms80, ms128, ms160, ms320, ms640, spare6, spare5, spare4, spare3, spare2, spare1}
}.

Example 56 includes the subject matter of Example 54, and optionally, wherein the symbol-level periodicity has a configuration including:
Periodicity ENUMERATED {ms10, ms20, ms32, ms40, ms64, ms80, ms128, ms160, ms320, ms640, ms5, ms2, ms1, symbol14, symbol7, symbol4, symbol2}.

Example 57 includes a machine-readable medium including code which, when executed, is to cause a machine to perform the method of any one of Examples 14-24 and 42-52.

Example 58 includes a product comprising one or more tangible computer-readable non-transitory storage media comprising computer-executable instructions operable to, when executed by at least one computer processor, enable the at least one processor to perform the method of any one of Examples 14-24 and 42-52.

Example 59 includes a method to be performed at a device of a New Radio (NR) evolved Node B, the method including performing the functionalities of the processing circuitry of any one of the Examples above.

Example 60 includes an apparatus comprising means for causing a wireless communication device to perform the method of any one of Examples 14-24 and 42-52.

Example 61 includes a product comprising one or more tangible computer-readable non-transitory storage media comprising computer-executable instructions operable to, when executed by at least one computer processor, enable the at least one computer processor to perform the method of any one of Examples 14-24 and 42-52.

Example 63 may include a signal as described in or related to any of the examples above, or portions or parts thereof.

Example 64 may include a signal in a wireless network as shown and described herein.

Example 65 may include a method of communicating in a wireless network as shown and described herein.

Example 66 may include a system for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

What is claimed is:

1. A device of a User Equipment (UE), comprising:
a Radio Frequency (RF) interface to communicate with a base station, and
processing circuitry coupled to the RF interface, the processing circuitry configured to:
   decode a downlink (DL) communication from the base station, the DL communication including DL Semi-Persistent Scheduling (SPS) assignments for respective DL SPS transmissions from the base station and a SPS Configuration (SPS-Config) parameter, the SPS-Config parameter including information on a symbol-level periodicity of the DL SPS transmissions; and
   decode the DL SPS transmissions based on a determination of the symbol-level periodicity,
   wherein the symbol-level periodicity includes a time based periodicity in submilliseconds or a symbol based periodicity in symbols, in addition to a time based milliseconds level periodicity of the DL SPS transmissions.

2. The device of claim 1, wherein the symbol-level periodicity includes two classes of periodicity including a submilliseconds level periodicity and a milliseconds level periodicity.

3. The device of claim 2, wherein the symbol-level periodicity has a configuration including:
Periodicity CHOICE {
   subMilliSeconds INTEGER {1 . . . 32}
   milliseconds ENUMERATED {ms10, ms20, ms32, ms40, ms64, ms80, ms128, ms160, ms320, ms640, spare6, spare5, spare4, spare3, spare2, spare1}
}.

4. The device of claim 2, wherein the symbol-level periodicity has a configuration including:
Periodicity ENUMERATED {ms10, ms20, ms32, ms40, ms64, ms80, ms128, ms160, ms320, ms640, ms5, ms2, ms1, symbol14, symbol7, symbol4, symbol2}.

5. The device of claim 2, wherein the processing circuitry includes MAC processing circuitry, and wherein determining the symbol-level periodicity includes, in response to a determination that the periodicity has units in milliseconds (ms), using the MAC processing circuitry to determine sequentially that an Nth DL SPS assignment of the DL SPS assignments occurs in a slot of a frame for which:

$$(numberOfSlotsPerFrame \times SFN + slot\ number\ in\ the\ frame) = [(numberOfSlotsPerFrame \times SFN_{start\ time} + slot_{start\ time}) + N \times periodicity \times numberOfSlotsPerFrame/10] modulo(1024 \times numberOfSlotsPerFrame)$$

where SFN refers to subframe number, and $SFN_{start\ time}$ and $slot_{start\ time}$ define the SFN and the slot respectively, of a first transmission of Physical Downlink Shared Channel (PDSCH) where the DL assignments were initialized or reinitialized.

6. The device of claim 2, wherein the processing circuitry includes MAC processing circuitry, and wherein determining the symbol-level periodicity includes, in response to a determination that the periodicity has units in submilliseconds, using the MAC processing circuitry to determine sequentially that an Nth DL SPS assignment of the DL SPS assignments occurs in a slot of a frame for which:

$$(numberOfSlotsPerFrame \times SFN + slot\ number\ in\ the\ frame) = [(numberOfSlotsPerFrame \times SFN_{start\ time} + slot_{start\ time}) + N \times periodicity] modulo\ (1024 \times numberOfSlotsPerFrame)$$

where SFN refers to subframe number, and $SFN_{start\ time}$ and $slot_{start\ time}$ define the SFN and the slot respectively, of a first transmission of Physical Downlink Shared Channel (PDSCH) where the DL assignments were initialized or reinitialized.

7. The device of claim 2, wherein the processing circuitry includes MAC processing circuitry, and wherein determining the symbol-level periodicity includes, in response to a determination that the periodicity has units in symbols, using the MAC processing circuitry to determine sequentially that an Nth DL SPS assignment of the DL SPS assignments occurs in a symbol of a slot of a frame for which:

$$(numberOfSlotsPerFrame \times SFN \times 14 + slot\ number\ in\ the\ frame \times 14 + symbol\ number\ in\ the\ slot) = [(numberOfSlotsPerFrame \times SFN_{start\ time} \times 14 + slot_{start\ time} \times 14 + symbol_{start\ time}) + N \times periodicity] modulo(1024 \times numberOfSlotsPerFrame \times 14)$$

wherein SFN refers to subframe number, and $SFN_{start\ time}$, $slot_{start\ time}$, and $symbol_{start\ time}$ define the SFN, the slot and the symbol respectively, of a first transmission of Physical Downlink Shared Channel (PDSCH) where the DL assignments were initialized or reinitialized.

8. The device of claim 2, wherein the processing circuitry is to:
   decode a DL signal comprising a Physical Uplink Control Channel (PUCCH) parameter including explicit information on a time interval between scheduled Physical Downlink Shared Channel (PDSCH) data and a Hybrid Automatic Repeat Request (HARQ) feedback where the explicit information including a nrofSymbolsToDl-Data parameter which defines the time interval in terms of a number of symbols between the HARQ feedback and the scheduled PDSCH data; and
   encode for transmission to the base station a PUCCH, a format of the PUCCH being based on the explicit information in the DL PUCCH parameter,
   wherein the processing circuitry is also to decode a value of 0 for a dl-DataToUL-ACK parameter included in the DL signal, and to determine the value of 0 to correspond to the HARQ feedback being transmitted in a same slot as the scheduled PDSCH data.

9. The device of claim 8, wherein the format of the PUCCH (PUCCH-format) is based on:

| PUCCH-format5 ::= | SEQUENCE { |
| initialCyclicShift | INTEGER(0..11), |
| nrofSymbols | INTEGER (1..2), |
| nrofSymbolsToDlData | INTEGER(1..13) |
| }. | |

10. The device of claim 1, wherein the symbol-level periodicity includes a hybrid of both the symbol based periodicity in symbols and the time based milliseconds level periodicity of the DL SPS transmissions.

11. A method to be performed at a User Equipment (UE), the method including:
  decoding a downlink (DL) communication from a base station, the DL communication including DL Semi-Persistent Scheduling (SPS) assignments for respective DL SPS transmissions from the base station;
  decoding the DL SPS transmissions based on the DL SPS assignments; and
  encoding for transmission, to the base station and on a Physical Uplink Control Channel (PUCCH), Hybrid Automatic Repeat Request (HARQ) feedback corresponding to the DL SPS transmissions, wherein a format of the PUCCH is configured with a nrofSymbolsToDlData parameter which defines a time interval between the DL SPS transmissions and the corresponding HARQ feedback.

12. The method of claim 11,
  wherein the DL communication further including a SPS Configuration (SPS-Config) parameter, the SPS-Config parameter including information on a symbol-level periodicity of the DL SPS transmissions, and
  wherein the symbol-level periodicity includes two classes of periodicity including a submilliseconds level periodicity and a milliseconds level periodicity.

13. The method of claim 12, wherein the symbol-level periodicity has a configuration including:
  Periodicity CHOICE {
    subMilliSeconds INTEGER {1 . . . 32}
    milliseconds ENUMERATED {ms10, ms20, ms32, ms40, ms64, ms80, ms128, ms160, ms320, ms640, spare6, spare5, spare4, spare3, spare2, spare1}
  }.

14. The method of claim 12, wherein the symbol-level periodicity has a configuration including:
  Periodicity ENUM ERATED {ms10, ms20, ms32, ms40, ms64, ms80, ms128, ms160, ms320, ms640, ms5, ms2, ms1, symbol14, symbol7, symbol4, symbol2}.

15. The method of claim 12, wherein determining the symbol-level periodicity includes, in response to a determination that the periodicity has units in milliseconds (ms), using a MAC processing circuitry of the device to determine sequentially that an Nth DL SFS assignment of the DL SFS assignments occurs in a slot of a frame for which:

(numberOfSlotsPerFrame×SFN slot number in the frame)=[(numberOfSlotsPerFrame× SFN$_{start\ time}$+slot$_{start\ time}$)+N×periodicity×numberOfSlotsPerFrame/10]modulo(1024×numberOfSlotsPerFrame)

where SFN refers to subframe number, and SFN$_{start\ time}$ and slot$_{start\ time}$ define the SFN and the slot respectively, of a first transmission of Physical Downlink Shared Channel (PDSCH) where the DL assignments were initialized or reinitialized.

16. The method of claim 12, wherein determining the symbol-level periodicity includes, in response to a determination that the periodicity has units in milliseconds (ms), using a MAC processing circuitry of the device to determine sequentially that an Nth DL SPS assignment of the DL SPS assignments occurs in a slot of a frame for which (numberOfSlotsPerFrame×SFN+slot number in the frame)=[(numberOfSlotsPerFrame× SFN$_{start\ time}$+slot$_{start\ time}$)+N×periodicity]modulo (1024×numberOfSlotsPerFrame)

where SFN refers to subframe number, and SFN$_{start\ time}$ and slot$_{start\ time}$ define the SFN and the slot respectively, of a first transmission of Physical Downlink Shared Channel (PDSCH) where the DL assignments were initialized or reinitialized.

17. The method of claim 12, wherein determining the symbol-level periodicity includes, in response to a determination that the periodicity has units in symbols, using a MAC processing circuitry of the device to determine sequentially that an Nth DL SPS assignment of the DL SPS assignments occurs in a symbol of a slot of a subframe for which:

(numberOfSlotsPerFrame×SFN×14+slot number in the frame×14+symbol number in the slot)= [(numberOfSlotsPerFrame×SFN$_{start\ time}$×14+ slot$_{start\ time}$×14+symbol$_{start\ time}$)+N×periodicity] modulo(1024×numberOfSlotsPerFrame×14)

wherein SFN refers to subframe number, and SFN$_{start\ time}$, slot$_{start\ time}$, and symbol$_{start\ time}$ define the SFN, the slot and the symbol respectively, of a first transmission of Physical Downlink Shared Channel (PDSCH) where the DL assignments were initialized or reinitialized.

18. The method of claim 12,
  wherein the nrofSymbolsToDlData parameter is explicitly configured in the format of the PUCCH by radio resource control (RRC) signaling and configured as a number of symbols between the DL SPS transmissions and the HARQ feedback.

19. A device of a base station, comprising:
  a memory configured to store instructions;
  a processor coupled to the memory, and when executing the instructions, configured to cause the base station to:
  transmit a downlink (DL) communication to a User Equipment (UE), the DL communication including DL Semi-Persistent Scheduling (SPS) assignments for respective DL SPS transmissions and a SPS Configuration (SPS-Config) parameter, the SPS-Config parameter including a symbol-level periodicity of the DL SPS transmissions;
  transmit, to the UE, the DL SPS transmissions based on the DL SPS assignments and the SPS-Config parameter; and
  receive, from the UE and on a Physical Uplink Control Channel (PUCCH), Hybrid Automatic Repeat Request (HARQ) feedback corresponding to the DL SPS transmissions, wherein a format of the PUCCH is configured with a nrofSymbolsToDlData parameter which defines a time interval between the DL SPS transmissions and the corresponding HARQ feedback.

20. The device of claim 19, wherein the symbol-level periodicity includes two classes of periodicity including a submilliseconds level periodicity and a milliseconds level periodicity.

* * * * *